United States Patent [19]

Guillemette

[11] Patent Number: 5,780,066

[45] Date of Patent: Jul. 14, 1998

[54] EXTRUSION DIE WITH CIRCUMFERENTIAL DISTRIBUTION GROOVE

[76] Inventor: A. Roger Guillemette, 37 Fairview Ave., West Warwick, R.I. 02893

[21] Appl. No.: 566,995

[22] Filed: Dec. 4, 1995

[51] Int. Cl.⁶ .................................................. B29C 47/12
[52] U.S. Cl. .................... 425/113; 264/176.1; 425/380; 425/382.4; 425/461; 425/467
[58] Field of Search .................... 425/113, 131.1, 425/133.1, 380, 382 R, 382.4, 461, 467; 264/176.1, 172.15, 171.13

[56] References Cited

U.S. PATENT DOCUMENTS

| | | | |
|---|---|---|---|
| 3,308,508 | 3/1967 | Schrenk | 425/133.1 |
| 3,327,349 | 6/1967 | Lennox | 425/133.1 |
| 3,334,382 | 8/1967 | Lefevre | 425/133.1 |
| 3,365,750 | 1/1968 | Donald | 425/133.1 |
| 3,479,425 | 11/1969 | Lefevre et al. | 425/133.1 |
| 3,820,927 | 6/1974 | Toomajanian | 425/113 |
| 3,947,173 | 3/1976 | Dougherty | 425/113 |
| 4,120,633 | 10/1978 | Feuerherm | 425/462 |
| 4,125,585 | 11/1978 | Rosenbaum | 425/133.1 |
| 4,134,952 | 1/1979 | Yoshikawa et al. | 425/133.1 |
| 4,248,824 | 2/1981 | Hattop | 425/133.1 |
| 4,279,851 | 7/1981 | Lord et al. | 425/113 |
| 4,365,949 | 12/1982 | Nash | 425/467 |
| 4,548,569 | 10/1985 | Pitigliano et al. | 425/133.1 |
| 4,657,497 | 4/1987 | Dehennau et al. | 425/133.1 |
| 4,657,718 | 4/1987 | Sicka et al. | 425/131.1 |
| 4,798,526 | 1/1989 | Briggs et al. | 425/113 |
| 5,108,683 | 4/1992 | Anand | 425/133.1 |
| 5,183,669 | 2/1993 | Guillemette | 425/113 |
| 5,316,583 | 5/1994 | Milliman | 425/113 |
| 5,565,218 | 10/1996 | Brown et al. | 425/113 |

*Primary Examiner*—Jay H. Woo
*Assistant Examiner*—Joseph Leyson
*Attorney, Agent, or Firm*—Perman & Green, LLP

[57] ABSTRACT

An extrusion die has a cylindrical body with an outer cylindrical wall, opposite first and second end walls, an axial bore extending therethrough, and bores for mounting the die to the extrusion system. The cylindrical body includes a flow inlet on the outer wall and first and second symmetrical flow channels which extend into the body from the flow inlet and terminate at a pair of opposite openings formed in the second end wall. A tapered end portion is in a concentric fashion with the cylindrical body. The end portion has a circumferential groove formed therein adjacent the juncture of the end portion and the cylindrical body wherein the pair of opposite openings are in fluid communication with the groove. A mating head has a body portion with a bore formed therein with an inner surface tapered to mate with the end portion of the die. The arrangement being such that molten material deposited with the flow inlet and through the symmetrical flow channels enters the groove formed in the end portion and flows within the annular space between the outer surface of the end portion and the inner surface of the mating head in a balanced and even flow to a point where the molten material coats wire being drawn through the bores of the die and mating head.

4 Claims, 5 Drawing Sheets

5,780,066

1

EXTRUSION DIE WITH CIRCUMFERENTIAL DISTRIBUTION GROOVE

BACKGROUND AND SUMMARY OF THE INVENTION

The instant invention relates to extrusion systems, and more particularly to an extrusion die for an extrusion system which deposits molten material on wire, for example.

In the manufacture of plastic-coated wire, rubber-coated wire, plastic tubing, or rubber tubing, molten plastic and/or rubber is extruded by means of a crosshead extrusion system which receives a stream of molten material and causes the molten material to be distributed around the circumference of a wire or tube. In this connection, a variety of crosshead devices have heretofore been known in the art. For example, the Guillemette U.S. Pat. No. 5,183,669 to discloses a crosshead extruder system which is operative for applying a layer of plastic onto a wire. In this regard, it is well-known in the crosshead art that it is extremely difficult to establish an even and balanced flow of molten plastic or rubber around the circumference of a wire or tube. For example, it is known that sharp turns in the material flow paths create "dead-spots" in the crosshead in which plastic or rubber material stagnates and becomes overheated. When plastic or rubber overheats or "cooks", it turns black, and thereafter, when the burnt material makes its way back into the flow stream, it causes discolored specs in the coating.

It is also known that splitting and re-blending the material stream causes weld or joint lines wherein the extruded material is not evenly blended together. In many of the known crosshead dies, the balanced flow problems are exaggerated even further because of lengthened flow paths, and pressure drops in enlarged flow areas.

The instant invention provides an extrusion die for an extrusion system which achieves a completely uniform and balanced flow with no "dead spots", so that a consistent, even thickness of extruded material is distributed around wire or tubing drawn through the die. Briefly, the instant extrusion die comprises a cylindrical body having an outer cylindrical wall, opposite first and second end walls, an axial bore extending therethrough, and means mounting the die to the extrusion system. The cylindrical body further includes a flow inlet on the outer wall, and first and second symmetrical flow channels which extend into the body from the flow inlet. The flow channels diverge outwardly toward the outer wall and turn forwardly and open outwardly into a pair of opposite openings formed in the second end wall. The die further comprises a tapered end portion integrally formed in a concentric fashion with the cylindrical body. The end portion has an axial bore coaxial with the bore of the cylindrical body, and a circumferential groove formed therein adjacent the juncture of the end portion and the cylindrical body wherein the pair of opposite openings are in fluid communication with the groove.

Further provided is a mating head including a body portion having a bore formed therein with an inner surface tapered to mate with the end portion of the die. The mating head is secured to the die in a position adjacent the end portion wherein the end portion is received within the bore and an annular space is formed between the end portion and the inner surface of the mating head. The arrangement being such that molten material deposited into the flow inlet and through the symmetrical flow channels enters the groove formed in the end portion and flows within the annular space between the end portion and the mating head in a balanced and even flow to a point where the molten material coats wire being drawn through the bores of the die and mating head.

The groove of the end portion has a front edge and a back edge, the back edge including two forwardly curved blending wedges which are positioned between the pair of openings. The blending wedges maintain the flow of molten material and prevent the stagnation of molten material in dead spots located within the groove.

Accordingly, it is an object of the instant invention to provide an extrusion die which has a balanced and even flow of material without any dead spots.

It is another object of the present invention to uniformly distribute molten material around the circumference of a wire or tube.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE PREFERRED EMBODIMENT

Figure 1:
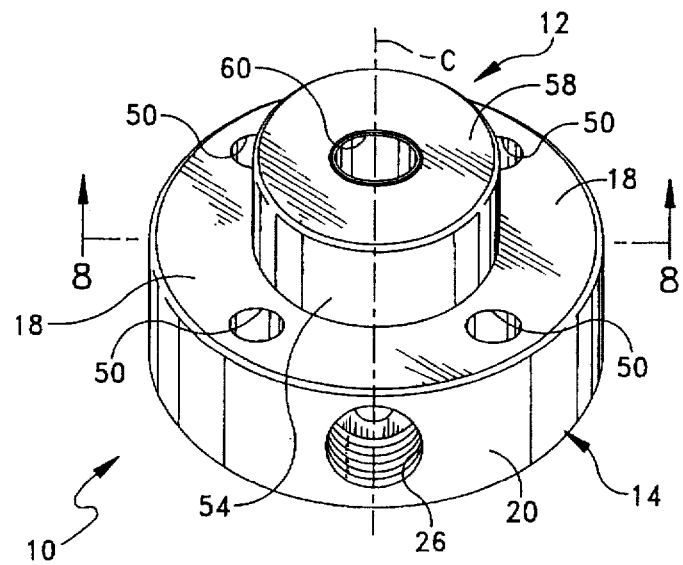
FIG. 1 is a perspective view of an extrusion die and mating head of the present invention.
Figure 2:
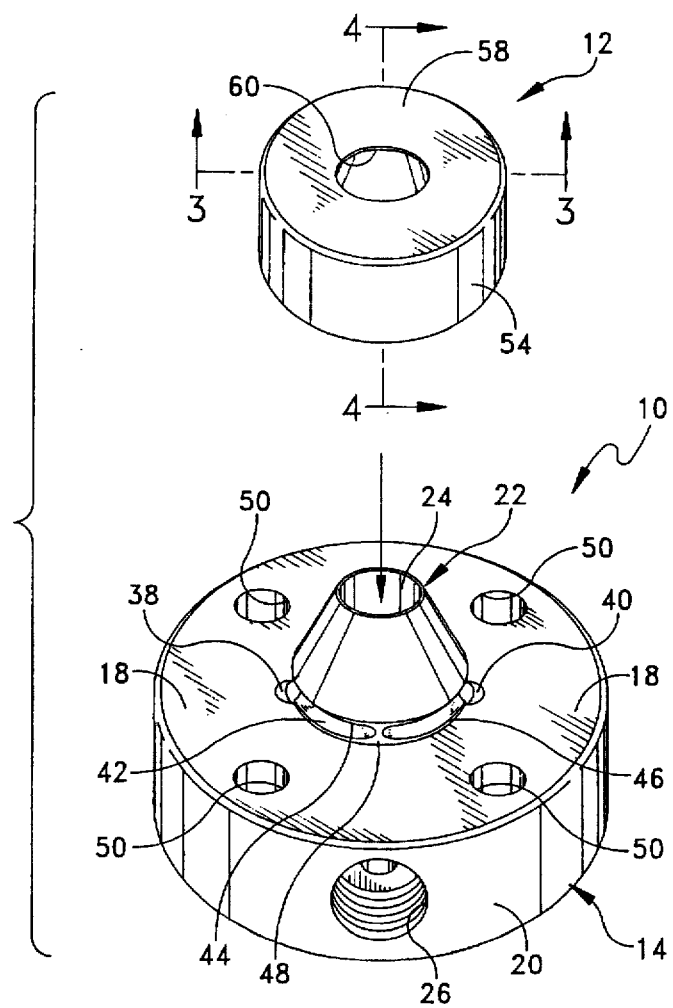
FIG. 2 is an exploded perspective view of the extrusion die and the mating head.
Figure 3:
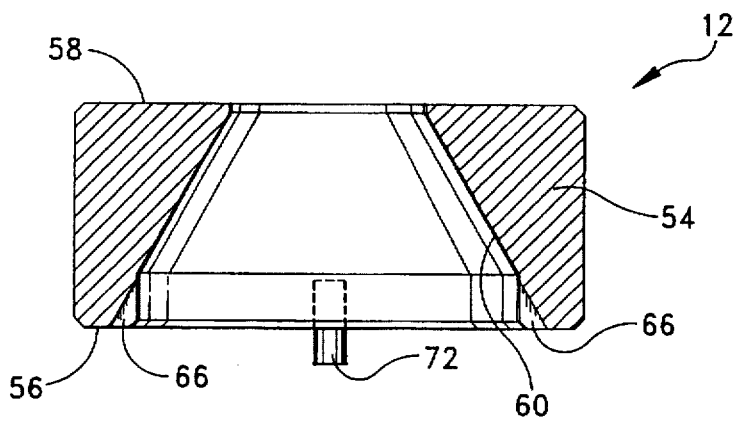
FIG. 3 is a cross-sectional view of the mating head taken along line 3—3 of FIG. 2.
Figure 4:
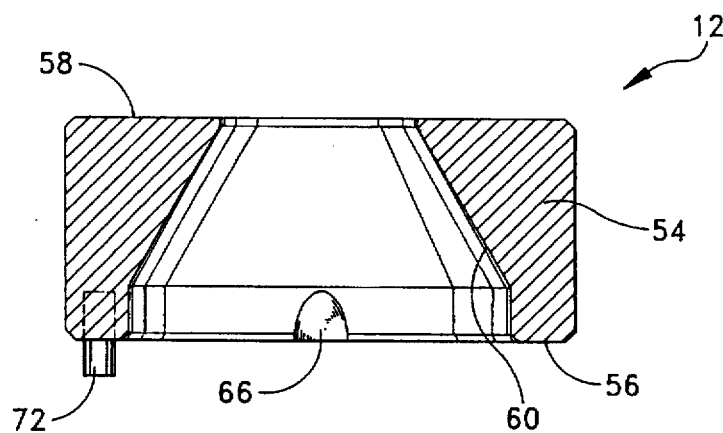
FIG. 4 is a cross-sectional view of the mating head taken along line 4—4 of FIG. 2.
Figure 5:
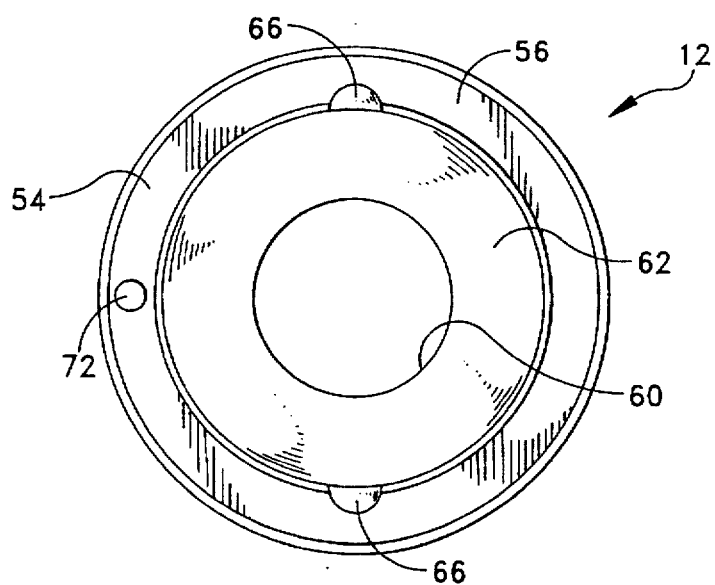
FIG. 5 is a bottom plan view of the mating head illustrated in FIGS. 3 and 4.

Referring now to the drawings, and more particularly to FIG. 1, there are generally illustrated at 10 and 12 an extrusion die and mating head, respectively, of the present invention. The instant extrusion die 10 and mating head 12 are operative for use in a single- or multi-layer extrusion system (not shown) which is well-known in the art and disclosed in the aforementioned patent to Guillemette. Although not illustrated, such an extrusion system typically comprises a body, a main bore extending longitudinally through the body, a core tube and spider assembly having an annular flow passage for receiving a stream of molten material, and an upper radial passage extending into the main bore for introducing a stream of molten material into the extrusion die 10 positioned within the bore of the body. Reference can be made to the patent to Guillemette for the overall configuration of the extrusion system. It is to be understood that the inventive concepts of instant die 10 and mating head 12 can be readily modified for incorporation into other various and diverse types of extrusion systems so that the benefits of balanced and even flow achieved in the instant invention can be obtained with virtually any single- or multi-layer extrusion system.

Figure 6:
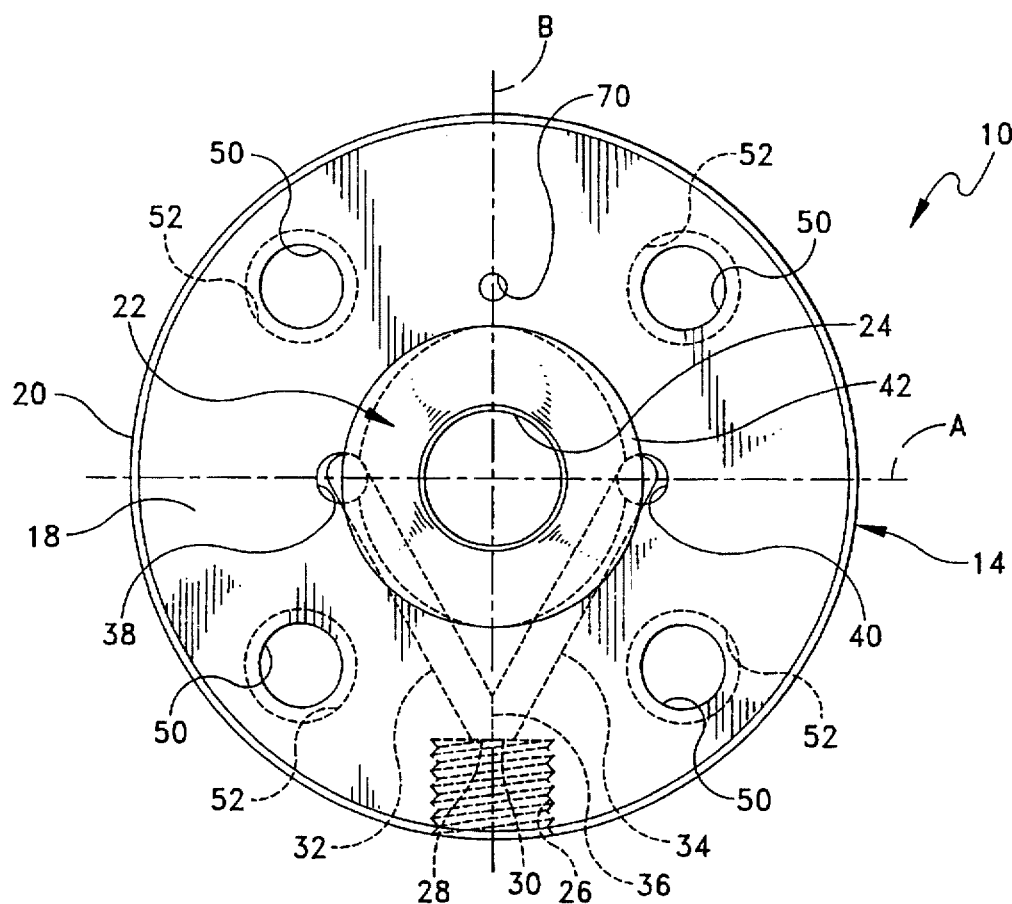
FIG. 6 is a top plan view of the extrusion die.
Figure 7:
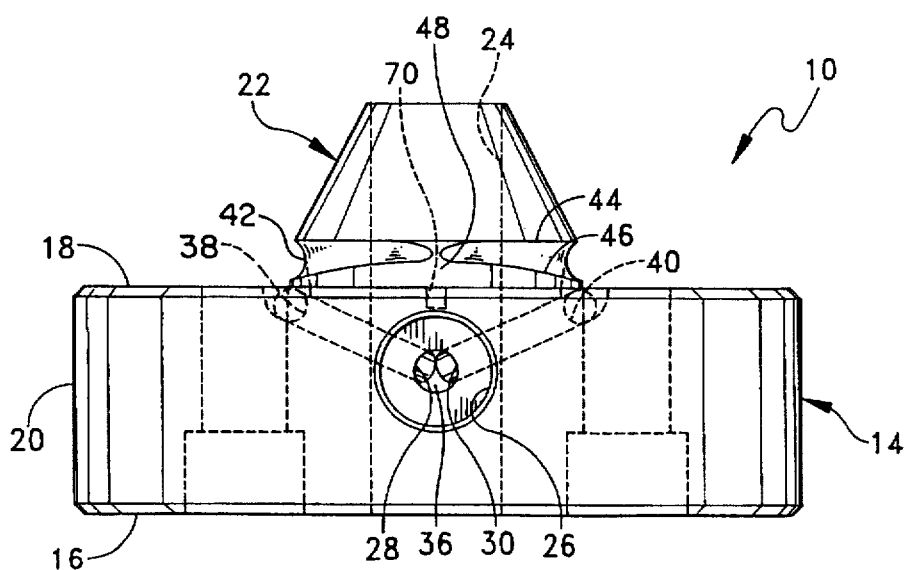
FIG. 7 is a front elevational view thereof.

Turning to FIGS. 2 and 6–8, the instant extrusion die 10 is operative for applying a single layer of molten material around a long thin member, such as a wire or tube (not shown), being drawn through it. The extrusion die 10 comprises a cylindrical body generally indicated at 14 having opposite first and second end walls 16 and 18, respectively, an outer wall 20, a horizontal centerline A and a vertical centerline B (FIG. 6). The die 10 further includes a tapered end portion, generally indicated at 22, at the second end wall 18, and an axial bore 24 which extends through the cylindrical body 14 and the tapered end portion 22 along axis C. Preferably, the extrusion die 10 is fabricated from a suitable steel alloy capable of withstanding high temperatures. The mating head 12 is also fabricated from the same material.

The cylindrical body 14 of die 10 further includes a flow inlet or bore 26 formed in the outer wall 20. As shown in FIG. 6, the flow inlet 26 is threaded to receive a fitting (not shown) for communication with the upper radial passage which delivers molten material to the die 10. It is pointed out that the flow inlet 26 is circumferentially aligned with the vertical centerline B. The die 10 further includes first and second openings 28, 30 in fluid communication with the flow inlet 26, the openings 28, 30 leading into first and second symmetrical flow channels 32, 34 which extend into the body 14 from respective openings 28, 30. The flow channels 32, 34 diverge outwardly from the vertical centerline B toward the outer wall 20. The first and second openings 28, 30 are adjacent within the flow inlet 26 and they cooperate to form a natural wedge-shaped flow splitter 36 in the flow inlet 26. The flow splitter 36 is aligned along the vertical centerline B and it evenly divides the incoming flow stream of molten material into the symmetrical flow channels 32, 34. When the flow channels 32, 34 reach the horizontal centerline A within the body 14 they turn forwardly and open outwardly into respective openings 38, 40 formed in the second end wall 18. It is pointed out that the openings 38, 40 of the second end wall 18 are positioned in opposite relation along the horizontal centerline A (FIG. 6).

Referring still to FIGS. 2 and 6–8, the tapered end portion 22 is integrally formed in a concentric fashion with the cylindrical body 14. It should be noted that the bore 24 extends through both the body 14 and the end portion 22 wherein the section of the bore 24 of the body 14 is coaxial with the section of the bore 24 of the end portion 22. A circumferential groove 42 is formed in the tapered end portion 22 adjacent the juncture of the end portion 22 and the cylindrical body 14. As shown, the groove 42 is in fluid communication with the pair of openings 38, 40 in the second end wall 18 whereby molten material delivered to the groove 42 is uniformly distributed within it. More specifically, the groove 42 has a front edge 44 and a back edge 46 wherein the back edge 46 includes two forwardly curved blending wedges each indicated at 48 which are positioned between the pair of openings 38, 40 along the vertical centerline B. The blending wedges 48 are provided for maintaining the flow of molten material within the groove 42 and for preventing the stagnation of molten material in dead spots located within the groove 42 which occur at locations generally corresponding to the vertical centerline B.

For mounting the extrusion die in a suitable manner (e.g., by machine bolts, not shown) to the body of the extrusion system, four cross bores each indicated at 50 are spatially and radially positioned at ninety degree intervals in the cylindrical body 14. Each cross bore 50 extends perpendicularly from the first end wall 16 to the second end wall 18 of the cylindrical body 14 and includes a counter bore 52 for receiving the head of the machine bolt.

Figure 8:
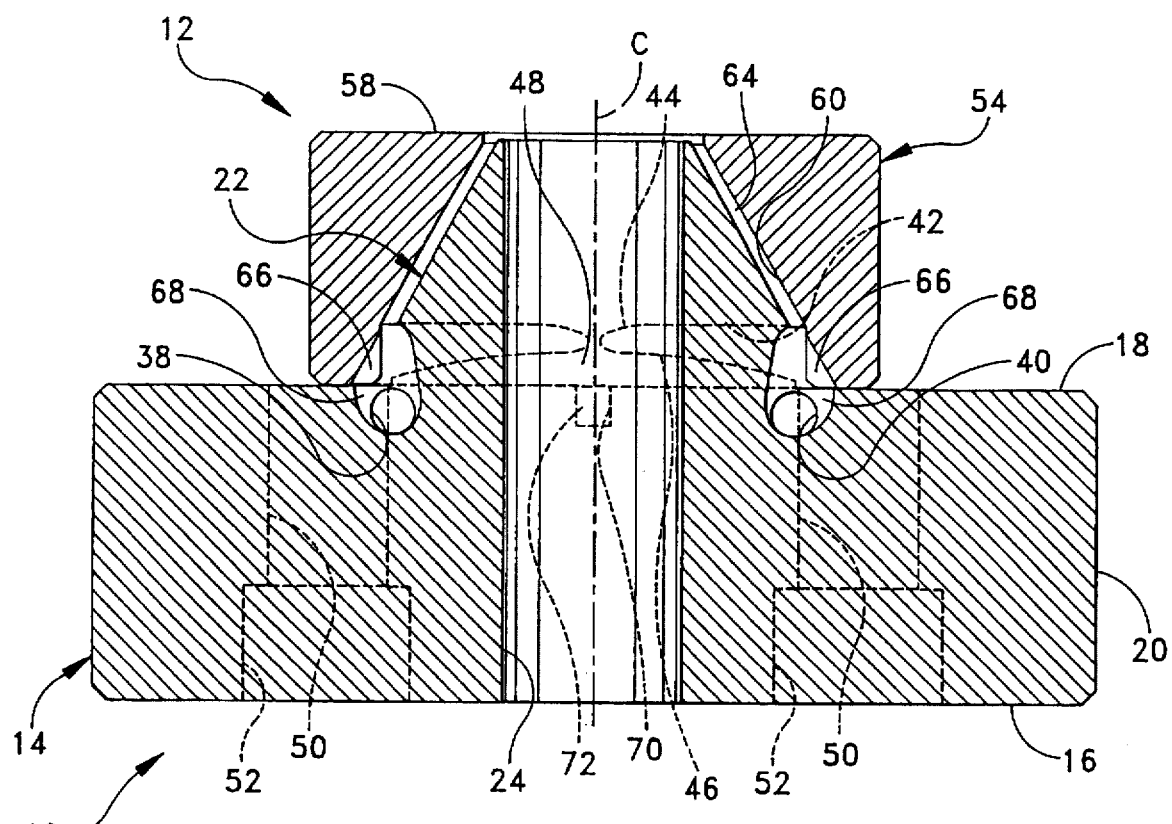
FIG. 8 is a cross-sectional view taken along line 8—8 of FIG. 1.

Turning now to FIGS. 2–5 and 8, the mating head 12 comprises an annular body portion generally indicated at 54 having opposite end walls 56, 58 and a bore 60 with an inner surface 62 (FIG. 5) tapered to mate with the end portion 22. As shown in FIG. 8, end wall 56 is positioned adjacent the second end wall 18 of the cylindrical body 14 of the die 10 when securing the mating head 12 to the die 10. In this position, the end portion 22 of the die 10 is received within the bore 60 of the mating head 12. There is an annular space 64 between the inner surface 62 of the mating head 12 and the outer surface of the end portion 22 of the die 10 for allowing molten material disposed within the circumferential groove 42 of the end portion 22 to flow along the tapered end portion 22 onto the wire to be coated. The mating head 12 is secured to the die by any suitable means and has a pair of oppositely positioned recesses 66 (FIGS. 4 and 5) formed in the body portion 54 adjacent the inner surface 62. The recesses 66 are aligned with and correspond to the openings 38, 40 formed in the second end wall 18 of the cylindrical body 14 to define pockets 68 (FIG. 8) which receive the molten material from the flow channels 32, 34. These pockets 68 are provided for maintaining the flow of molten material between the flow channels 32, 34 and the circumferential groove 42.

The cylindrical body 14 of the die 10 has a bore 70 formed therein from the second end wall 18 which extends along an axis perpendicular to the plane of the second end wall 18. The bore 70 is provided for receiving a positioning pin 72 which extends perpendicularly and outwardly from the end wall 56 of the mating head 12. By inserting the pin 72 within the bore 70 of the die 10, the mating head 12 is positioned with respect to the cylindrical body 14 of the die 10 so that the recesses 66 of the mating head 12 are aligned with openings 38, 40 formed in the second end wall 18 of the cylindrical body 14 which form the pockets 68 described above.

The arrangement is such that molten material delivered under pressure via the upper radial passage of the extrusion system into the flow inlet 26 of the extrusion die 10 is then divided evenly into two streams by the flow splitter 36 which is in communication with the flow inlet 26. The two streams of molten material travel through the body 14 via flow channels 32, 34 and then turn forwardly in the flow channels 32, 34 and exit therefrom into the groove 42 via openings 38, 40, and fills the groove 42 completely. The blending wedges 48 ensure that the flow of material is constant through the groove 42 for preventing stagnation of molten material in the dead spots located within the groove 42. The molten material then flows through the annular space 64 between the end portion 22 and the inner surface 62 of the mating head 12 in a balanced and even manner to a point where the material coats the wire being drawn through the bores 24, 60 of the die 10 and mating head 12, respectively.

In prior art die structures having the groove formed in the second end wall of the cylindrical body, it was found that high viscosity molten material tended to immediately flow over the portions of the inner edge of the groove which are directly adjacent to the flow outlets before flowing completely around the groove. The instant invention addresses this problem by forming the groove 42 in the tapered end portion 22 and providing blending wedges 48 on the back edge 46 of the groove 42 in order to slightly reduce the flow of material over those portions of the front edge 44 which are directly adjacent to the flow openings 38, 40. Accordingly, it can be seen that the material will tend to flow further around the groove 42 before spilling over the front edge 44 so that a more even and balanced flow of material over the front edge 44 is achieved.

It can therefore be seen that the instant invention provides a unique extrusion die 10 and a mating head 12 which effectively balance material flow and evenly distribute material around the circumference of a wire. The adjacent entrance positions of the flow channels 32, 34 create a natural flow splitter 36 which evenly distributes the material flow into symmetric flow channels 32, 34. The internal flow channels 32, 34 quickly and directly move the plastic or rubber molten material to the groove 42 formed in the tapered end portion 22 for further distribution. The blending wedges 48 in the groove 42 effectively re-blend the separated flow streams into a continuous annular flow thereby eliminating weld lines in the finished product. For these reasons, the instant invention is believed to represent a significant advancement in the art which has substantial commercial merit.

Figure 9:
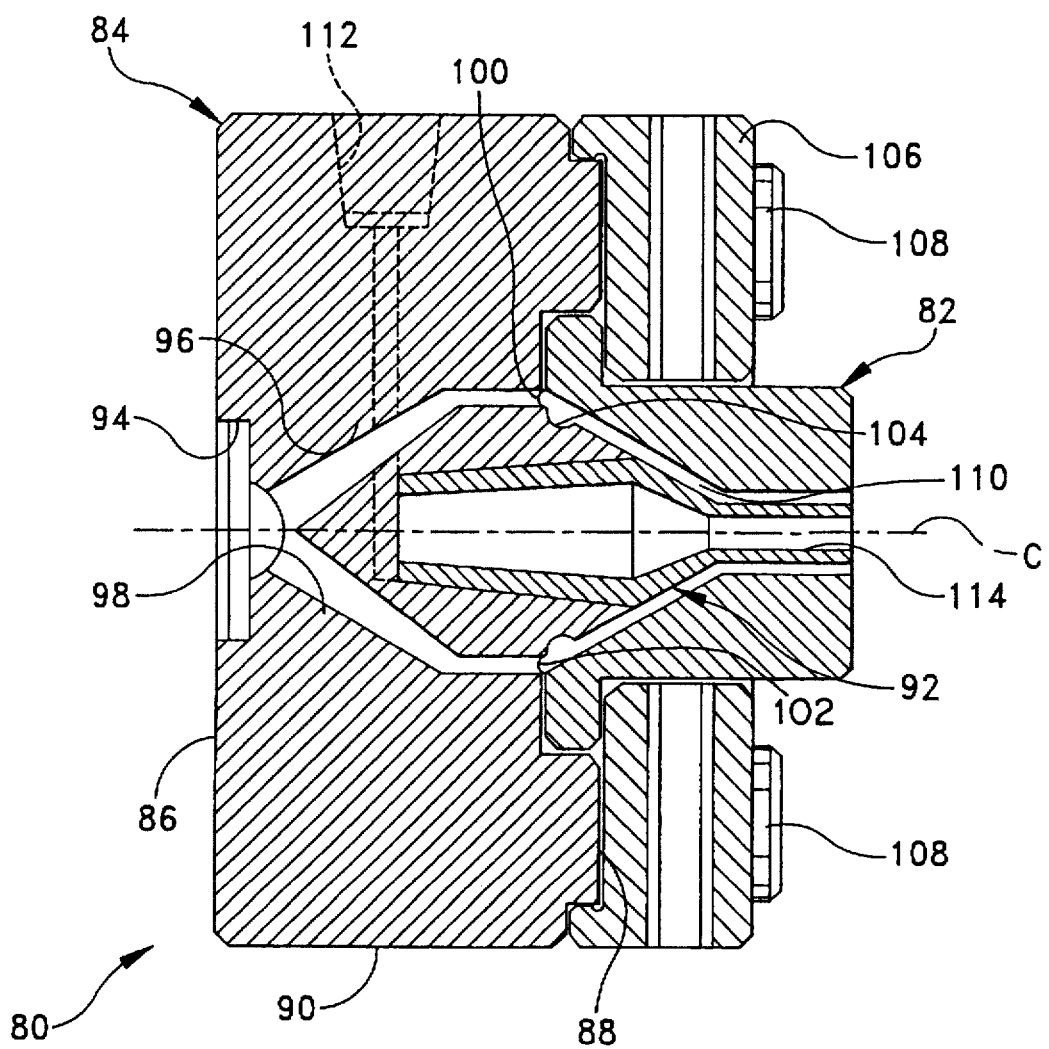
FIG. 9 is a cross-sectional view of an extrusion die and a mating head of another preferred embodiment.

Referring now to FIG. 9, there is generally indicated at 80 a spiderless, in-line extrusion die. As with extrusion die 10, die 80 cooperates with a mating head which is generally indicated at 82. Die 80 and mating head 82 are constructed for producing extruded tubing. As shown, the extrusion die 80 comprises a cylindrical body portion, generally indicated at 84, having two opposing end walls 86, 88 and a cylindrical outer wall 90, and a tapered end portion, generally indicated at 92. The extrusion die 80 has a flow inlet 94 formed in the vertical end wall 86 of the body portion 84. Preferably, the flow inlet 94 is threaded to receive a fitting (not shown) for communication with a suitable passage which delivers molten material to the die 80. The die 80 further includes first and second symmetrical flow channels 96, 98 which extend into the body portion 84 from the flow inlet 94. The flow channels 96, 98 diverge outwardly from the axial centerline C of the body portion 84 toward the outer wall thereof. The flow channels 96, 98 turn forwardly and open outwardly into an circumferential groove 104, through outlet openings, 100, 102 formed adjacent the tapered end portion 92 of the die 80.

Referring still to FIG. 9, the tapered end portion 92 is integrally formed in a concentric fashion with the cylindrical body 84. As with die 10, a circumferential groove 104 is formed in the tapered end portion 92 adjacent the juncture of the end portion 92 and the cylindrical body 84. As shown, the groove 104 is in fluid communication with the pair of openings 100, 102 whereby molten material delivered to the groove 104 is uniformly distributed within it. Circumferential groove 104 operates in an identical manner to groove 42 of extrusion die 10 for delivering molten material uniformly over the tapered end portion 92. The mating head 82 cooperates with the tapered end portion 92 for channeling molten material within a channel 110 formed between the two portions. When the molten material leaves the mating head 82 it is in the form of extruded tubing. An annular mounting collar 106 suitably mounts the mating head 82 to the extrusion die 80. As shown, machine bolts 108 fasten the collar 106 to the body portion 84.

The arrangement is such that molten material is delivered to the flow channels 96, 98 from the flow inlet. After entering the circumferential groove 104, the material is uniformly delivered in the channel 110 between the tapered end portion 92 and the mating head 82. Air is delivered via a port 112 formed in the body portion 84 of the die 80, the port 112 being in fluid communication with a bore 114 formed along axis C for delivering air within the extruded material as is well-known in the art of tube extrusion. The construction of the groove 104 in the die 80 illustrated in FIG. 9 addresses the aforementioned flow problems by forming the groove 104 and providing blending wedges (not shown, but identically formed in the tapered end portion 92 as wedges 48 are formed in die 10) on the back edge of the groove 104 in order to slightly reduce the flow of material over these portions of the front edge of the groove 104. Accordingly, it can be seen that material will tend to flow further around the groove 104 before spilling over its front edge so that a more even and balanced flow of material is achieved.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An extrusion die for extruding molten materials comprising:

a cylindrical body having an outer surface and opposite first and second end walls, a flow inlet formed in said body to receive molten material, and first and second symmetrical flow channels which diverge and extend into said body directly from said flow inlet, said flow channels communicating with a pair of openings formed in the second end wall, and a tapered end portion integrally formed in a concentric fashion with the cylindrical body, said end portion having an outer surface and a circumferential groove formed therein adjacent the juncture of the end portion and the cylindrical body to receive molten material from said pair of openings; and a mating head including a body portion having a frustroconically-shaped bore formed therein with an inner surface tapered to mate with the end portion, the mating head being secured to the cylindrical body in a position adjacent the end portion wherein the end portion is received within the bore and an annular channel is formed between the end portion and the inner surface of the mating head, the arrangement being such that molten material deposited with said flow inlet and through the symmetrical flow channels enters the groove formed in said end portion and flows within said annular channel between the outer surface of the end portion and the inner surface of the mating head in a balanced and even flow.

2. An extrusion die as set forth in claim 1, said groove of the end portion having a front edge and a back edge, said back edge including two forwardly curved blending wedges which are positioned between said pair of openings, said blending wedges maintaining the flow of molten material and preventing the stagnation of molten material in dead spots located within the groove.

3. An extrusion die for extruding molten materials as described in claim 1, wherein the cylindrical body and the, end portion, are further constructed with an axial bore extending therethrough to allow the passage of a thin member through the die, and wherein the flow inlet is constructed on the outer surface of the cylindrical body with the flow channels extending through the cylindrical body in a manner which does not intersect the axial bore, wherein said molten material flowing from the die coats the thin member passing through the axial bore.

4. An extrusion die for extruding molten materials as described in claim 1, wherein the flow inlet is constructed in the first end wall of the cylindrical body wherein said molten material flowing from the die forms a tubular member.

* * * * *